(No Model.)
F. MIRO.
INSULATOR.
No. 438,934. Patented Oct. 21, 1890.
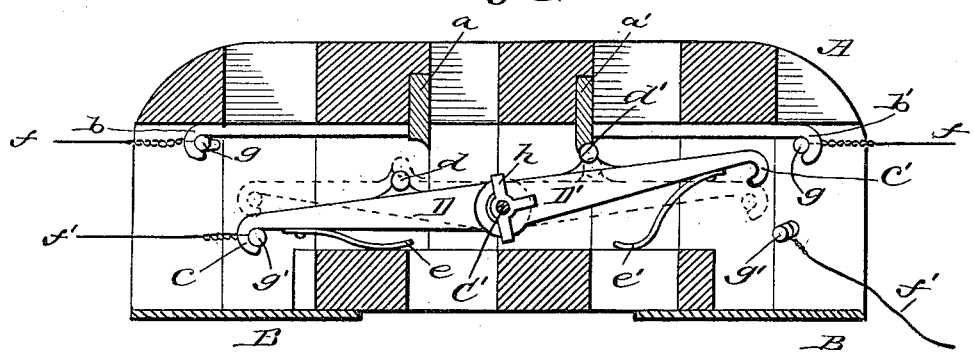
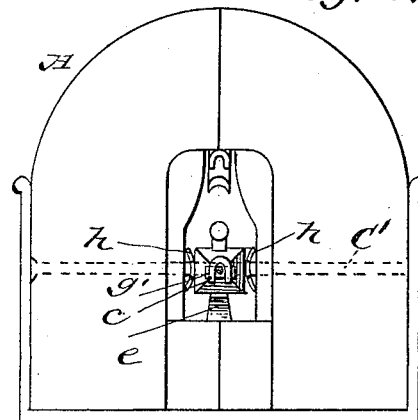
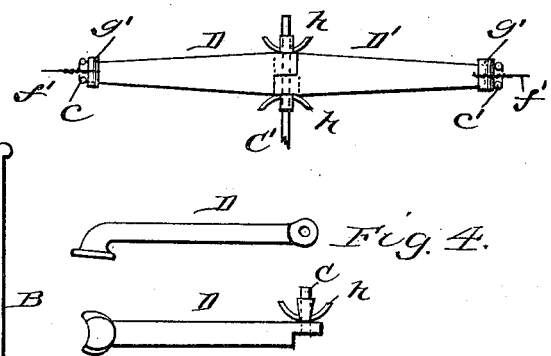
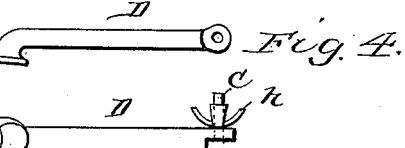
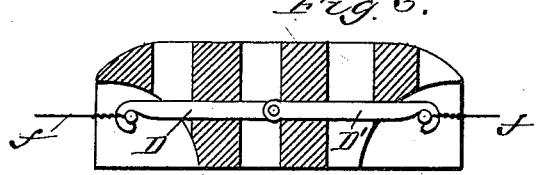
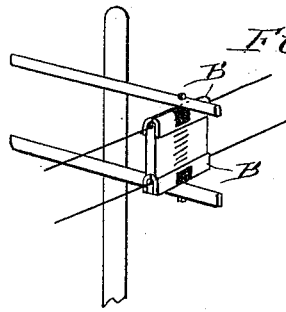
WITNESSES:
N. R. Davis.
C. Sedgwick
INVENTOR:
F. Miro
BY Munn & Co
ATTORNEYS

UNITED STATES PATENT OFFICE.

FIDEL MIRO, OF CIENFUEGOS, CUBA.

INSULATOR.

SPECIFICATION forming part of Letters Patent No. 438,934, dated October 21, 1890.

Application filed June 6, 1890. Serial No. 354,492. (No model.)

*To all whom it may concern:*

Be it known that I, FIDEL MIRO, of Cienfuegos, Cuba, have invented a new and Improved Insulator, of which the following is a specification, reference being had to the annexed drawings, forming a part thereof, in which—

Figure 1 is a longitudinal section of my improved insulator. Fig. 2 is an end elevation. Fig. 3 is a detail plan view of the spring-pressed arms for receiving the ends of the wire. Fig. 4 shows a side elevation and inverted plan view of one of the arms. Fig. 5 is a longitudinal section of a simple form of the insulator, and Fig. 6 shows the application of the insulator to widely-separated wires.

Similar letters of reference indicate corresponding parts in all the views.

The object of my invention is to provide an insulator for telegraph, telephone, and electric-light wires, especially those carrying high-tension current, which will support the wire so long as it is entire, but will release it as soon as it is broken and automatically make connection with an adjoining wire.

My invention consists in a casing formed of insulating material and made in halves, contact-pieces contained in the upper portion of the casing, and a pair of hooked arms pivoted in the center of the casing, extending outwardly toward the ends, and provided upon their free extremities with hooks for receiving the ends of the sections of telegraph-wire.

The invention also further consists in the combination, with the arms, of springs attached to the pivoted arms and adapted to throw them up against the contact-pieces in the upper part of the casing when the line-wire breaks and releases the arms, all as will be hereinafter more fully described.

The casing A, which is formed of insulating material, is apertured longitudinally and made in two longitudinal halves, which are indented upon their adjoining surfaces so that they will interlock when placed together. The casing A thus formed is held by two clips B, one at either end of the casing, each clip being provided with a screw-threaded shank C for insertion in the cross-arm of a telegraph-pole.

The casing A is provided with contact-pieces $a\ a'$, to which are attached the metallic hooks $b\ b'$, which extend toward opposite ends of the casing.

Upon a rod $C'$, extending transversely through the center of the casing, are pivoted arms $D\ D'$, which extend in opposite directions and are provided at their free ends with double hooks $c\ c'$. The upper sides of the arms $D\ D'$ are provided with contact-pieces $d\ d'$, which are arranged relative to the arms $D\ D'$, so that when the said arms are thrown up in the manner presently to be described an electrical contact will be formed between the arms and the contact-pieces $a\ a'$.

To the under surfaces of the arms $D\ D'$ are attached flat springs $e\ e'$, which rest upon the lower part of the casing A and tend to throw the arms $D\ D'$ upwardly.

The ends of the line-wire sections $f$, which are held by the hooks $b\ b'$, are connected with cross-bars $g$, which are received by the hooks, while the wires pass out between the hooks of each pair, as shown in Fig. 1. In a similar way the wires $f'$, which are received in the double hooks $c\ c'$ at the ends of the arms $D\ D'$, are secured to bars $g'$, which are received by the hooks, and the line-wires pass out between the hooks, as shown in Figs. 1 and 3. The tension and the weight of the line-wire sections $f'$ are sufficient to partly overcome the lifting-power of the springs $e\ e'$, thus holding the contacts $d\ d'$ on the tops of the arms away from the contact-pieces $a\ a'$.

To hold the arms $D\ D'$ in a central position in the casing A, apertured springs $h$ are placed on the rod $C'$ between the pivoted ends of the arms $D\ D'$ and the walls of the casing.

When either of the wire sections $f$ breaks, the arms $D\ D'$, with which it is connected, being released, the springs $e\ e'$ attached to the arms throw them upward, so that a contact is formed between the arms and the contact-pieces $a\ a'$, thus re-establishing the circuit through the wires $f$. At the same time the ends of the sections drop out of the hooks upon the ends of the arms, thus preventing cross-connections between the wires $f$ and the arms and avoiding other difficulties connected with the existence of dead-wires.

In Fig. 5 is shown a similar arrangement, in which the arms $D\ D'$ are fixed, and the recoil of the broken wire and its weight are relied upon to disengage it from the inverted hooks by which it is held.

In Fig. 6 is shown a vertically-extended insulator adapted to widely-separated wires, the construction being substantially the same as that shown in Fig. 1.

In the arms shown in Fig. 4, in lieu of double hooks, a hook having an enlarged rounded end is used for receiving a loop formed upon the end of the wire section.

Having thus described my invention, I claim as new and desire to secure by Letters Patent—

1. In an insulator for electric wires, the combination of a pair of downwardly-opening hooks adapted to receive and sustain the ends of the wire sections and provided with contact-pieces at their ends, and a pair of spring-pressed pivoted arms furnished with downwardly-opening hooks, adapted to receive the ends of the wire sections and arranged to close a circuit through the upper wires when the lower wires are broken, substantially as specified.

2. In an insulator for electric wires, the combination, with the longitudinally-divided casing A, of the spring-pressed arms D D', pivoted in the casing and provided with hooks at their free extremities, and contact-pieces $a\ a'$, provided with hooks $b\ b'$, substantially as specified.

3. In an insulator for electric wires, the combination, with the longitudinally-divided casing A, of the spring-pressed arms D D', pivoted in the casing and provided with hooks at their free extremities, the contact-pieces $a\ a'$, provided with hooks $b\ b'$, and the clips B, substantially as specified.

FIDEL MIRO.

Witnesses:
D. OCTAVIO ORTISLAFFIGNY,
ARISTIDES VASSEUR.